United States Patent
Chen et al.

(10) Patent No.: US 9,886,513 B2
(45) Date of Patent: Feb. 6, 2018

(54) PUBLISH-SUBSCRIBE SYSTEM WITH REDUCED DATA STORAGE AND TRANSMISSION REQUIREMENTS

(71) Applicant: International Business Machines Corporation, Armonk, NY (US)

(72) Inventors: Chen Chen, Haifa (IL); Benjamin Mandler, Zichron Yaakov (IL); Nir Naaman, Haifa (IL); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 14/720,848

(22) Filed: May 25, 2015

(65) Prior Publication Data
US 2016/0350424 A1   Dec. 1, 2016

(51) Int. Cl.
G06F 17/30 (2006.01)
H04L 12/58 (2006.01)

(52) U.S. Cl.
CPC .. G06F 17/30867 (2013.01); G06F 17/30575 (2013.01); H04L 51/08 (2013.01)

(58) Field of Classification Search
None
See application file for complete search history.

(56) References Cited

U.S. PATENT DOCUMENTS

| | | | | |
|---|---|---|---|---|
| 7,412,493 B2 * | 8/2008 | Duigenan | ............. | H04L 12/185 709/217 |
| 7,653,670 B2 | 1/2010 | Hasan et al. | | |
| 8,229,736 B2 * | 7/2012 | Fletcher | ............ | G06F 17/30684 704/9 |
| 8,635,365 B2 | 1/2014 | Todd | | |
| 8,706,478 B2 * | 4/2014 | Fletcher | ............ | G06F 17/30684 704/9 |
| 8,756,288 B2 | 6/2014 | Bedi et al. | | |
| 8,849,754 B2 * | 9/2014 | Craggs | ................... | G06Q 10/10 707/628 |
| 8,982,882 B2 * | 3/2015 | Gallant | ................... | H04L 51/14 370/310 |
| 2011/0252046 A1 | 10/2011 | Szabo et al. | | |
| 2012/0271940 A1 | 10/2012 | Di Pietro et al. | | |
| 2012/0275466 A1 | 11/2012 | Bhadra et al. | | |
| 2013/0297656 A1 | 11/2013 | Wang | | |
| 2014/0280342 A1 | 9/2014 | Litherland | | |

OTHER PUBLICATIONS

Mohammad Hashem Haghighat., "Payload Attribution via Character Dependent Multi-Bloom Filters", IEEE Transactions on Information Forensics and Security, vol. 8, No. 5, May 2013.

* cited by examiner

*Primary Examiner* — Debbie Le (57) ABSTRACT

A publish-subscribe data messaging system in which wildcard subscriptions are represented in an approximate membership set or filter, such as a Bloom filter, for distribution to brokers together with formatting rules associated with the wildcard subscriptions, where a broker receiving a publication topic of a data publication for distribution to other brokers uses the formatting rules provided by any given broker to create wildcard versions of the publication topic for matching with the wildcard subscriptions that are represented in the approximate membership sets or filters provided by the given brokers, where, if a match exists, the data publication is forwarded to the given broker.

20 Claims, 4 Drawing Sheets

PUBLISH-SUBSCRIBE SYSTEM WITH REDUCED DATA STORAGE AND TRANSMISSION REQUIREMENTS

BACKGROUND

Various computer architectures and protocols include software applications that are aware of the data needs of other software applications for the purpose of providing data to other software applications. For example, in some publish-subscribe data messaging protocols, cooperative software applications, sometimes referred to as "brokers," that disseminate data publications to each other provide their subscriptions to each other in order to reduce overall data transmission requirements. Thus, when a data publication of a given publication topic is received by one of the brokers from a publisher, rather than broadcasting the data publication to all the other brokers, the broker checks the subscriptions of the other brokers, and only sends the data publication to those other brokers that have a subscription that matches the publication topic of the data publication. In order to reduce the data storage requirements for storing the subscriptions, as well as to reduce the amount of data transmission resources required to provide the subscriptions to the brokers, data structures, such as Bloom filters, may be used to represent subscriptions with greatly reduced storage requirements. However, it would be advantageous to improve the operation of computers, data storage devices, and communications therebetween by reducing the data storage and transmission requirements in this regard still further.

SUMMARY

In one aspect of the invention, in a publish-subscribe data messaging system is provided where wildcard subscriptions that include wildcard tokens are used to represent groups of subscriptions that do not, and the wildcard subscriptions are themselves represented in a data structure, such as a Bloom filter.

In another aspect of the invention a method is provided for operating a publish-subscribe data messaging system, the method including receiving at a first computer-hosted software application a publication topic associated with a data publication, where the publication topic is expressed as a hierarchy of topic levels, selecting a formatting rule associated with a wildcard subscription that is represented in a collection of subscriptions of a second computer-hosted software application, where the wildcard subscription is expressed as a hierarchy of topic levels, and where the formatting rule identifies at least one topic level of the wildcard subscription that is represented with a wildcard token, for each topic level of the wildcard subscription that the formatting rule indicates is represented with a wildcard token, and that corresponds to a topic level of the publication topic, replacing the corresponding topic level of the publication topic with the wildcard token from the corresponding topic level of the wildcard subscription, thereby creating a wildcard version of the publication topic, determining if a match exists in the collection of subscriptions for the wildcard version of the publication topic, and if the match exists, forwarding the data publication from the first computer-hosted software application to the second computer-hosted software application via a data communications medium.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
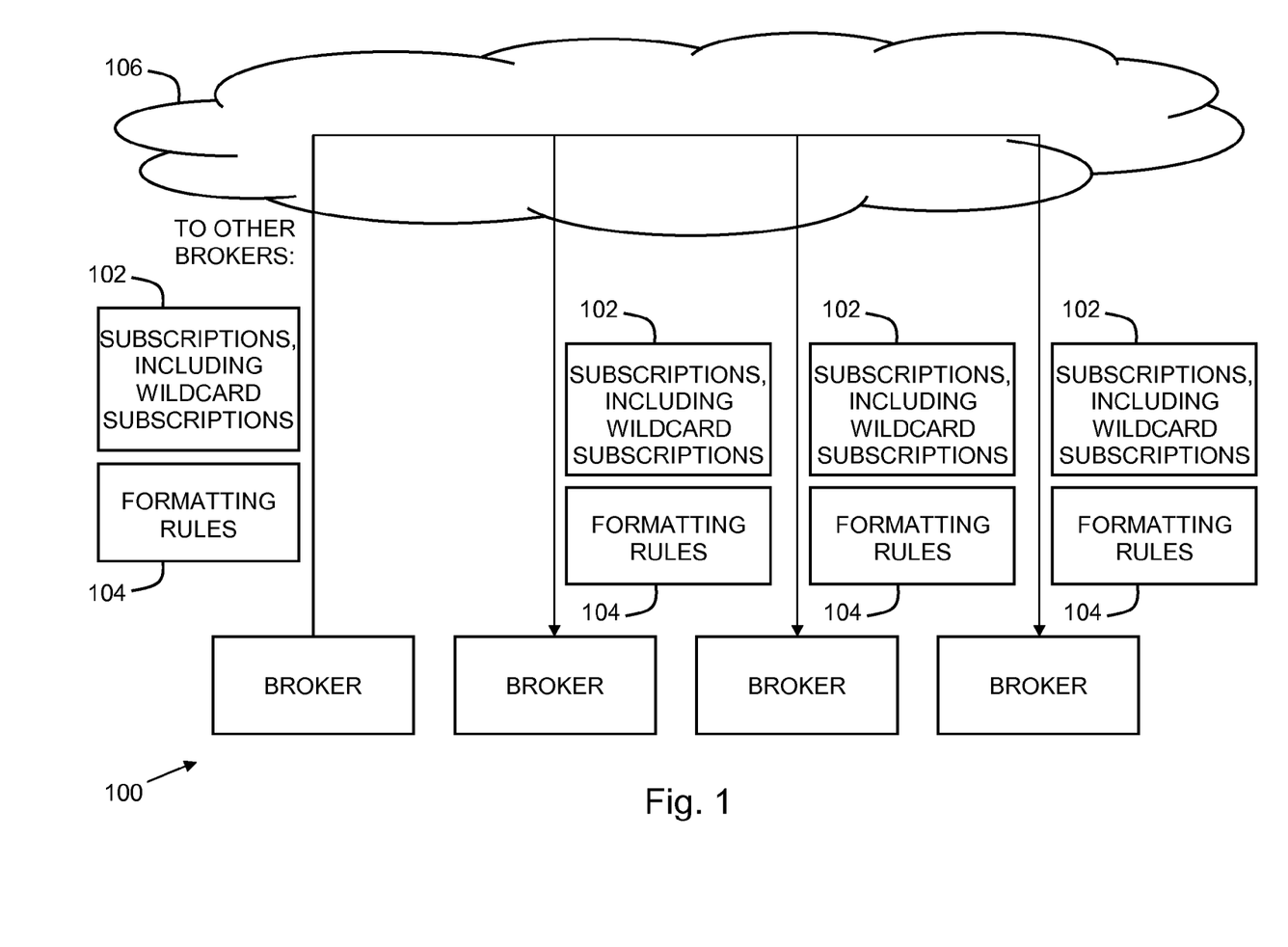
FIG. 1 is a simplified conceptual illustration of a publish-subscribe system with reduced data storage and transmission requirements, constructed and operative in accordance with an embodiment of the invention.

Reference is now made to FIG. 1, which is a simplified conceptual illustration of a publish-subscribe system with reduced data storage and transmission requirements, constructed and operative in accordance with an embodiment of the invention. In the system of FIG. 1, a cluster 100 of multiple brokers in a publish-subscribe data messaging system is shown. The publish-subscribe data messaging system may employ any publish-subscribe data messaging protocol, such as MQTT, where each of the brokers maintains subscriptions 102, such as may have been received from subscribers, where a subscription is expressed as a hierarchy of topic levels;

subscriptions received from subscribers may be "exact" subscriptions with explicitly specified topic levels, such as "news/sports/football", or may be "wildcard" subscriptions that include wildcard tokens at one or more topic levels, such as "news/+/football" or "news/#";

each broker provides its exact and wildcard subscriptions 102 to the other brokers; and when a data publication of a given publication topic is received by one of the brokers from a publisher, the broker checks the subscriptions 102 received from the other brokers, and only sends the data publication to those other brokers that have a subscription that matches the given publication topic.

In accordance with the invention, the subscriptions that each broker in cluster 100 provides to the other brokers in cluster 100 may include wildcard subscriptions that are represented in a data structure, such as in a Bloom filter or any other approximate membership set or filter. When a broker provides its wildcard subscriptions in this manner, the broker also provides corresponding formatting rules 104 that identify which topic levels in the wildcard subscriptions have wildcard tokens.

The brokers in cluster 100 are preferably implemented, in accordance with conventional techniques, as computer applications embodied in computer hardware and/or in computer software embodied in a non-transitory, computer-readable medium, and are hosted by one or more computers, where the brokers in cluster 100 communicate with each other via a data communications medium 106, such as a computer network.

Figure 2:
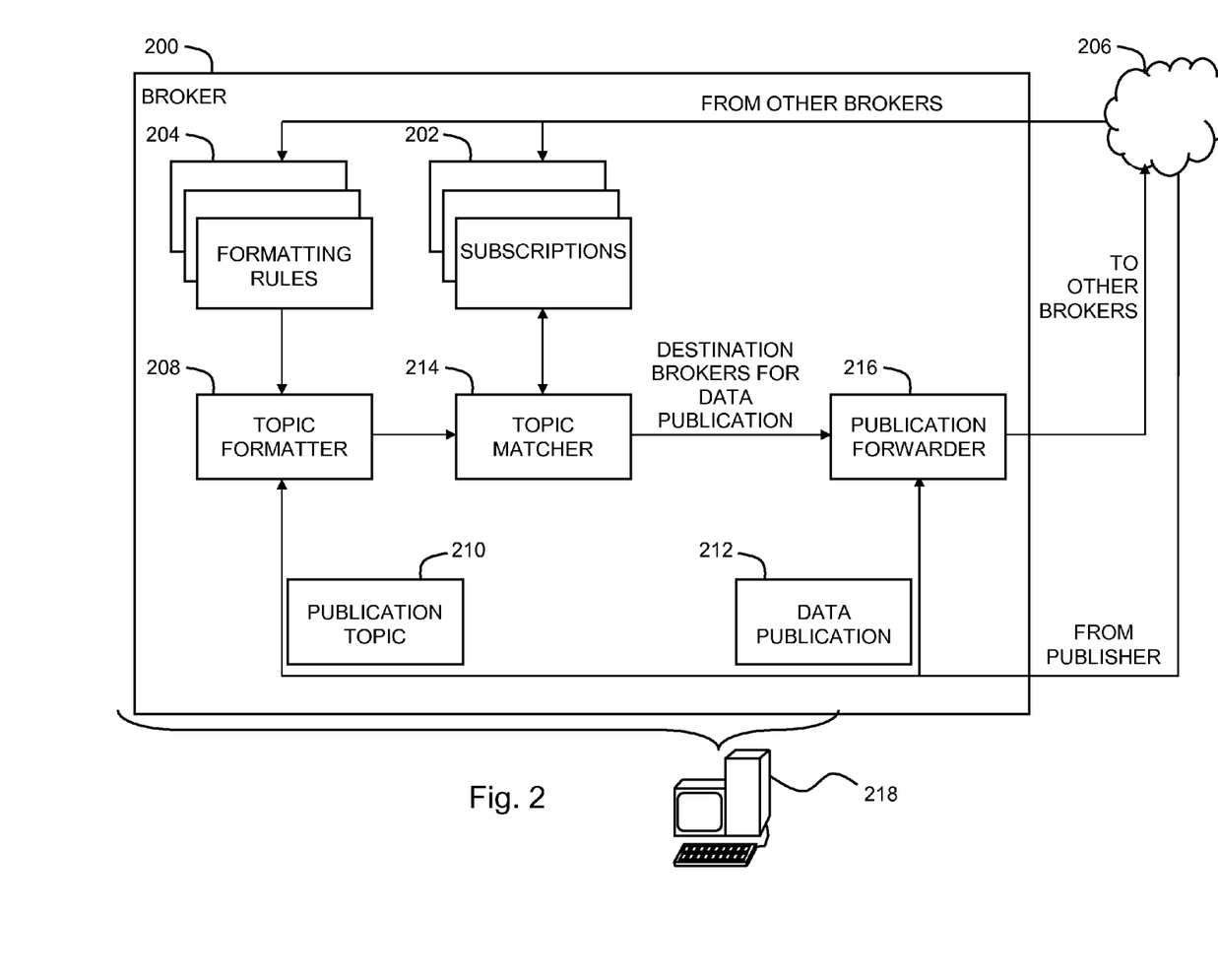
FIG. 2 is a simplified conceptual illustration of broker configuration in a system for routing publish-subscribe messages using wildcard subscriptions, constructed and operative in accordance with an embodiment of the invention.

In an embodiment of the invention, any, and preferably each, of the brokers in cluster 100 are configured as shown in FIG. 2, which is a simplified conceptual illustration of broker configuration in a system for routing publish-subscribe messages using wildcard subscriptions, constructed and operative in accordance with an embodiment of the invention. In the system of FIG. 2, a broker 200 is shown possessing subscriptions 202 received from other brokers, where each subscription 202 is expressed as a hierarchy of topic levels, as well as formatting rules 204 received from the other brokers, where each formatting rule 204 is associated with any of subscriptions 202 that include one or more wildcard tokens, where each formatting rule 204 identifies the topic levels in a given subscription 202 that are represented by wildcard tokens. Subscriptions 202 are represented in a data structure, such as a Bloom filter, and the subscriptions 202 and their formatting rules 204 may be received from the other brokers via a data communications medium 206, such as a computer network.

Broker 200 is preferably configured with a topic formatter 208 that is configured to receive a publication topic 210, where publication topic 210 is expressed as a hierarchy of topic levels, and where publication topic 210 is associated with a data publication 212, such as where publication topic 210 and its associated data publication 212 are received from a publisher of data publication 212. Topic formatter 208 selects any of formatting rules 204 for any selected broker and, given the subscription 202 that is associated with the selected formatting rule 204, for each topic level of the associated subscription 202 that the selected formatting rule 204 indicates is represented with a wildcard token, topic formatter 208 replaces the corresponding topic level of publication topic 210 with the wildcard token, thereby creating a wildcard version 210' of publication topic 210.

Broker 200 is also preferably configured with a topic matcher 214 that is configured to determine if a match exists for wildcard version 210' of publication topic 210 in the selected broker's copy of subscriptions 202. If a match exists, topic matcher 214 indicates to a publication forwarder 216 that the selected broker is to receive data publication 212, whereupon publication forwarder 216 forwards publication topic 210 and data publication 212 to the selected broker, such as via data communications medium 206.

Topic formatter 208 and topic matcher 214 preferably operate as described above for each of the formatting rules 204 received from other brokers, creating different wildcard versions of publication topic 210 for different ones of the formatting rules 204 for each selected broker until a match is found for that broker.

Any of the elements shown in FIG. 2 are preferably implemented in computer hardware and/or in computer software embodied in a non-transitory, computer-readable medium in accordance with conventional techniques, such as where broker 200 is hosted by a computer 218.

Figure 3:
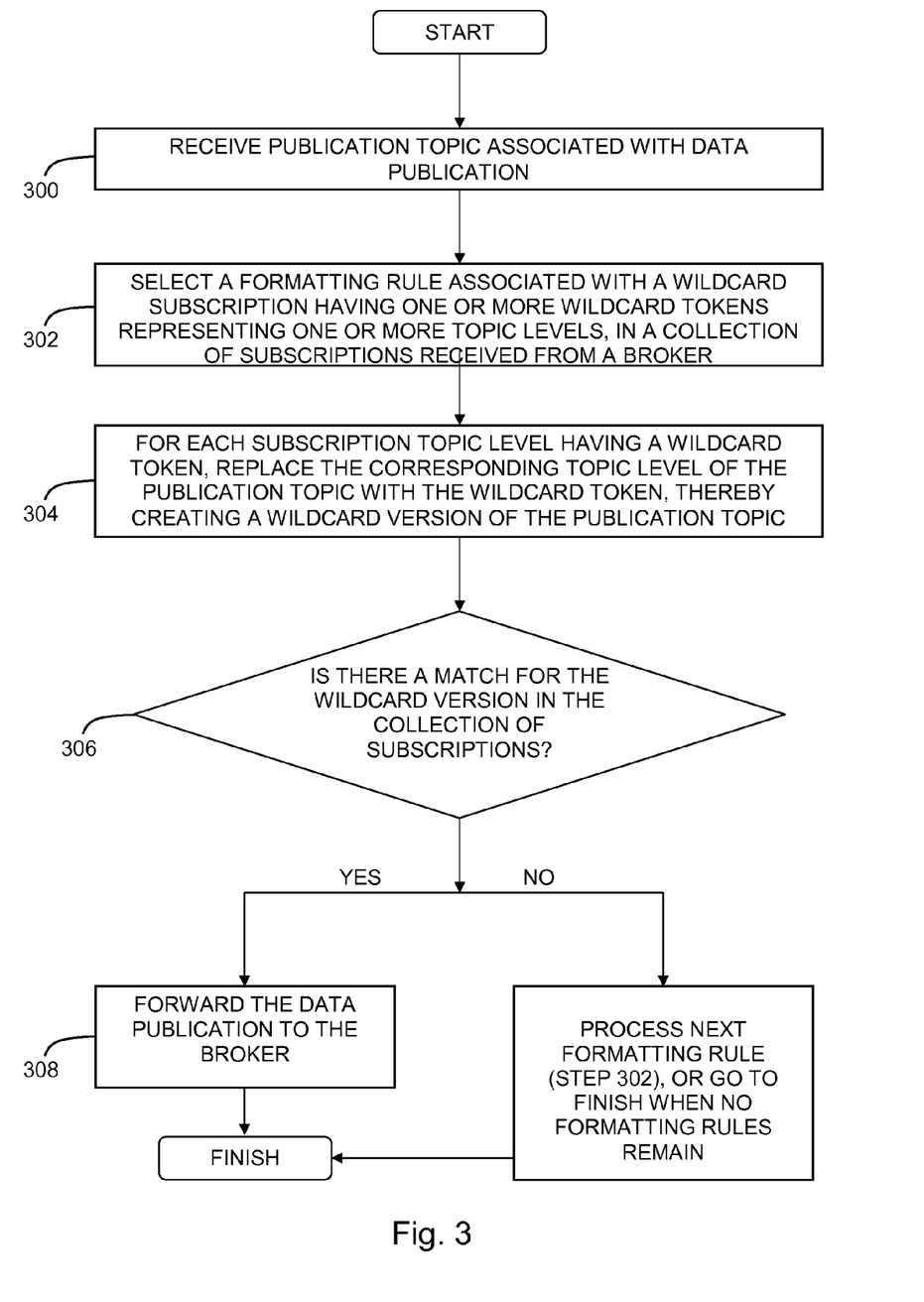
FIG. 3 is a simplified flowchart illustration of an exemplary method of operation of the system of FIGS. 1 and 2, operative in accordance with an embodiment of the invention.

Reference is now made to FIG. 3 which is a simplified flowchart illustration of an exemplary method of operation of the system of FIGS. 1 and 2, operative in accordance with an embodiment of the invention. In the method of FIG. 3, a publication topic associated with a data publication in a publish-subscribe data messaging system is received at a first computer-hosted software application, such as at a broker in a publish-subscribe system, where the publication topic is expressed as a hierarchy of topic levels (step 300). A formatting rule is selected, where the formatting rule is associated with a subscription that is represented in a collection of subscriptions, such as in a Bloom filter, of a second computer-hosted software application, such as of another broker in the publish-subscribe system (step 302), where the subscription is expressed as a hierarchy of topic levels, and where the formatting rule identifies at least one topic level of the subscription that is represented with a wildcard token. For each topic level of the subscription that the formatting rule indicates is represented with a wildcard token, and that corresponds to a topic level of the publication topic, the corresponding topic level of the publication topic is replaced with the wildcard token from the corresponding topic level of the subscription, thereby creating a wildcard version of the publication topic (step 304). If a match exists in the collection of subscriptions for the wildcard version of the publication topic (step 306), the data publication is forwarded from the first computer-hosted software application to the second computer-hosted software application via a data communications medium (step 308). If there is no match, the process above is preferably repeated with the next formatting rule and continues until a match is found or no formatting rules remain.

Operation of the system of FIGS. 1 and 2 and the method of FIG. 3 may be further appreciated in the context of the following examples.

In one example, a broker A in a publish-subscribe data messaging system using the MQTT protocol provides a Bloom filter of broker A's subscriptions to broker B, where the Bloom filter includes the wildcard subscriptions 'a/b/#' and 'a/c/e/#', where 'a', 'b', 'c', and 'e' are sub-topics that are not represented by a wildcard token, where the wildcard token '#' is a truncation wildcard token that represents any sub-topic at that topic level and below, and where topic levels are separated using '/'. Broker A also provides a data structure P including a set of formatting rules p(1) . . . p(n). Each formatting rule p(i) records the location, in number of levels, of the wildcard tokens in the subscriptions. Thus, in the current example, P={3,4}. Broker B receives a data publication from a publisher along with its publication topic 'a/b/c/d/e'. A wildcard version of the publication topic is created using the prefix of the publication topic to a depth of p(i)−1 topic levels, beyond which topic level the publication topic is truncated, and to which '#' is appended. The Bloom filter is then searched for a match for the wildcard version of the publication topic. Thus, for p(1)=3, the Bloom filter is searched for 'a/b/#', which results in a match. For p(1)=4, the Bloom filter may also be searched for 'a/b/c/#' which does not result in a match. However, since the search for 'a/b/#' resulted in a match, the search for 'a/b/c/#' need not be performed. Since a match was found, broker B forwards the data publication to broker A.

In another example, the Bloom filter of broker A's subscriptions includes the wildcard subscriptions 'a/+/c' and 'a/c/e/+', where the wildcard token '+' is a substitution wildcard token that represents any sub-topic at that topic level only. In this example, P={2,4}. Broker B receives a data publication from a publisher along with its publication topic 'a/c/e/d'. A wildcard version of the publication topic is created for P(1)=2 by replacing the second topic level of 'a/c/e/d' with a '+', producing 'a/+/e/d'. The Bloom filter is searched for 'a/+/e/d', which does not result in a match. A wildcard version of the publication topic is created for P(2)=4 by replacing the fourth topic level of 'a/c/e/d' with a '+', producing 'a/c/e/+'. The Bloom filter is searched for 'a/c/e/+', which does result in a match. Since a match was found, broker B forwards the data publication to broker A.

In another example, the Bloom filter of broker A's subscriptions includes the wildcard subscriptions 'a/+/c/+' and 'a/b/c/+/+/f'. Each formatting rule p(i) includes the locations of the substitution wildcard tokens, such that P={(2,4), (4,5)}. Broker B receives a data publication from a publisher along with its publication topic 'a/b/c/d/e/f'. A wildcard version of the publication topic is created for P(1)=(2,4) by replacing the second and fourth topic levels of 'a/b/c/d/e/f' with a '+', producing 'a/+/c/+/e/f'. The Bloom filter is searched for 'a/+/c/+/e/f', which does not result in a match. A wildcard version of the publication topic is created for P(2)=(4,5) by replacing the fourth and fifth topic levels of 'a/b/c/d/e/f' with a '+', producing 'a/b/c/+/+/f'. The Bloom filter is searched for 'a/b/c/+/+/f', which does result in a match, whereupon broker B forwards the data publication to broker A.

In one embodiment of the invention, for each wildcard subscription having substitution wildcard tokens only, the corresponding formatting rule in P indicates the length of the wildcard subscription as well, as p(i)=(<token-locations>, <length>). If a publication topic does not equal the subscription length of a given formatting rule, a wildcard version of the publication topic need not be created for matching against the Bloom filter. Thus, in the preceding example, 'a/+/c/+' would be represented as P={(2,4,4)}, and since the length of 'a/b/c/d/e/f' is longer than 4, 'a/+/c/+/e/f' would not be generated.

In another example, the Bloom filter of broker A's subscriptions includes the wildcard subscriptions 'a/+/c/+/e/#', 'a/b/+/d/e/#'. In this example, each formatting rule p(i) includes the locations of both the '+' wildcard tokens and the '#' wildcard token, such that P={(2,4,6), (3,6)}, where the last number in each p(i) is assumed to represent a '#'. For each formatting rule, a wildcard version of the publication topic is created using the prefix of the publication topic to the depth of the '#' topic level, beyond which topic level the publication topic is truncated, and to which '#' is appended. The '+' topic levels are then substituted. Thus, a received publication topic 'a/x/c/d/e/f' produces 'a/+/c/+/e/#' and 'a/x/+/d/e/#', of which 'a/+/c/+/e/#' results in a match, whereupon broker B forwards the data publication to broker A.

A general procedure is now described for applying the system of FIGS. 1 and 2 and the method of FIG. 3 for a subscription S of MQTT subscriptions represented in a Bloom filter BF, for which a set of formatting rules P is provided, where:
h<j> encodes the location j of the '#' symbol at the end,
e<k> encodes the number of levels k of the filter when it does not end with a '#',
s<$i_1, \ldots, i_k$> encodes the location of '+' symbols, and
|S| is an operator that returns the number of levels in a subscription S.

The Bloom filter BF, and the accompanying formatting rules set P, of which p is a member, may be constructed as follows:

---
If the subscription S contains a '#' at the end, let
    Add h<|S|> to p
Else
    Add e<|S|> to p;
End
If S contains '+' at locations $i_1, \ldots, i_k$
    add s<$i_1, \ldots, i_k$> to p
End
Insert S into BF;
Add p into P.

---

Each broker's BF and P are then provided to the other brokers as described hereinabove.

Since many different wildcard subscriptions may result in the same formatting rule p, the broker that provides its subscriptions may augment the data structure that includes its formatting rules P to include the number of times a certain formatting rule p was inserted in to it. This is necessary in order to support removal of a formatting rule after the last wildcard subscription associated with it is cancelled. This technique is preferably used in conjunction with a type of Bloom filter that supports deletions, such as a counting Bloom filter.

When a publication topic T is received, a wildcard version $T_1$ is created and tested against the subscriptions in BF as follows:

---
For every formatting rule p in P do
    If p contains h<j>
        If |T| >= j−1
            $T_1$ = the prefix of size j−1 levels from T
            $T_1$ += '/#'
        Else
            continue (to next p)
        End
    Else If |T| == k from e<k>
        $T_1$ = T
    Else
        continue (to next p)
    End
    If p contains s<$i_1,\ldots,i_k$>
        Replace the levels <$i_1,\ldots,i_k$> in $T_1$ with '+'
    End
    match = test_BF($T_1$, BF)
    If match == true
        return True
    End
End
Return False

---

In order to increase efficiency, the formatting rules may be ordered to minimize the average number of formatting and matching steps required. One way to achieve this is to estimate the 'hit' frequency of each formatting rule p, and order the list in descending 'hit-rate' order, where a 'hit' of a formatting rule p occurs when the evaluation of that particular rule causes the algorithm to return True. A 'miss' occurs when a formatting rule p does return True, and therefore the loop advances to the next p, or terminates with a False. This may be done by swapping the location of rules p(i) and p(i−1) (when i>1) whenever there is a hit in rule p(i). Alternatively, a counter c(i) may be added to each rule. When rule p(i) is hit, the counter is increased by 1, and p(i) and p(i−1) are swapped if c(i)>c(i−1). Swapping continues until the rule p(j) has c(j)<=c(j−1), or j=1, as in a bubble sort. When a counter overflows, all the counters may be divided by 2.

In the above examples, when broker B forwards a data publication to broker A along with the publication topic that resulted in a match, broker B also preferably forwards to broker B one or more of the following:

The formatting rule that resulted in a match as described above, or a unique identifier of the formatting rule if one was received for the formatting rule, from which broker B may generate the wildcard version of the publication topic that resulted in a match;

The wildcard version of the publication topic that resulted in a match.

If broker A determines that the data publication received from broker B does not match any subscription maintained by broker A for its subscribers, i.e., the matching performed by broker B produced a false positive result, broker A preferably places the associated wildcard version of the publication topic in a blacklist maintained by broker A. Additionally or alternatively, broker A determines which of its formatting rules resulted in the false positive result, either by identifying the formatting rule directly from the wildcard version of the publication topic that resulted in a match that was received from broker B, or by using the formatting rule or formatting rule identifier received from broker B to reconstruct the wildcard version as described above. Server A may then choose to remove the wildcard subscriptions associated with the formatting rule from the Bloom filter, and disseminate these wildcard subscriptions to the other brokers using any other means. Server A then also deletes the offending formatting rule from the set P.

The system of FIGS. 1 and 2 and the method of FIG. 3 may be employed in a publish-subscribe data messaging system using the Java™ Message Service (JMS) publish-subscribe data messaging protocol, where the '#' wildcard may appear anywhere within a wildcard subscription at one or more locations, and where the '#' and '+' symbols may appear in subscriptions where they do not represent wildcards. For example, where 'a/b/#/d/e' is stored in a Bloom filter, a formatting rule p(i) may be expressed as <j,k>, where j indicates the topic level in which the "#" appears, and where k indicates the number of levels in the subscription. In this example, p(i)={3,5}. For a given publication topic T, for every p(i) in P, if |T|<k−1, return false; otherwise, take the first j−1 levels of T, append '#', and then append the last k−j levels of T and check BF for a match. This may be extended to multiple '#' symbols in arbitrary locations by fusing everything between the first and last '#' into a single '#'. This creates a wildcard expression that is wider than the original. Thus, 'a/#/c/#/e' is converted into 'a/#/e'.

When a JMS subscription includes multiple '#' and/or '+' symbols in multiple locations, the location of the '#' and '+' symbols are specified, as is the total number of topic levels in the subscription. The '#' indexes $(j_1, \ldots, j_m)$ divide the filter into fixed size fragments, which may contain '+' symbols. When matching a topic T to BF, wildcard versions are generates from T for all the substrings that contain the same number and size of fragments as in the wildcard pattern, separated by a '#'. Thus, for example, the formatting rule for the subscription 'a/#/c/#/e' is (2,4,5). For T='a/x/y/c/z/e' the generated strings would be 'a/#/x/#/e', 'a/#/y/#/e', 'a/#/c/#/e', and 'a/#/z/#/e'.

When the subscription also includes '+' symbols, all the combinations of fixed fragments from T are generated, and then '+' symbols are inserted in the appropriate locations. Thus, for example, the formatting rule for the subscription 'a/#/+/#/e' is h<2,4>, s<3>, e<5>, where h<2,4> is an extension of h<j>. For T='a/x/y/c/z/e', the generated combinations are 'a/#/x/#/e', 'a/#/y/#/e', 'a/#/c/#/e', and 'a/#/z/#/e', and replacing location 3 with a '+' results in 'a/#/+/#/e'.

The invention, by teaching the use of subscriptions in a publish-subscribe data messaging system that include wildcard subscriptions, the use of data structures, such as Bloom filters, to represent wildcard subscriptions, and the use of formatting rules to work with wildcard subscriptions, reduces the data storage and transmission requirements associated with managing subscriptions, thereby improving the operation of computers, data storage devices, and computer networks that employ the invention.

Figure 4:
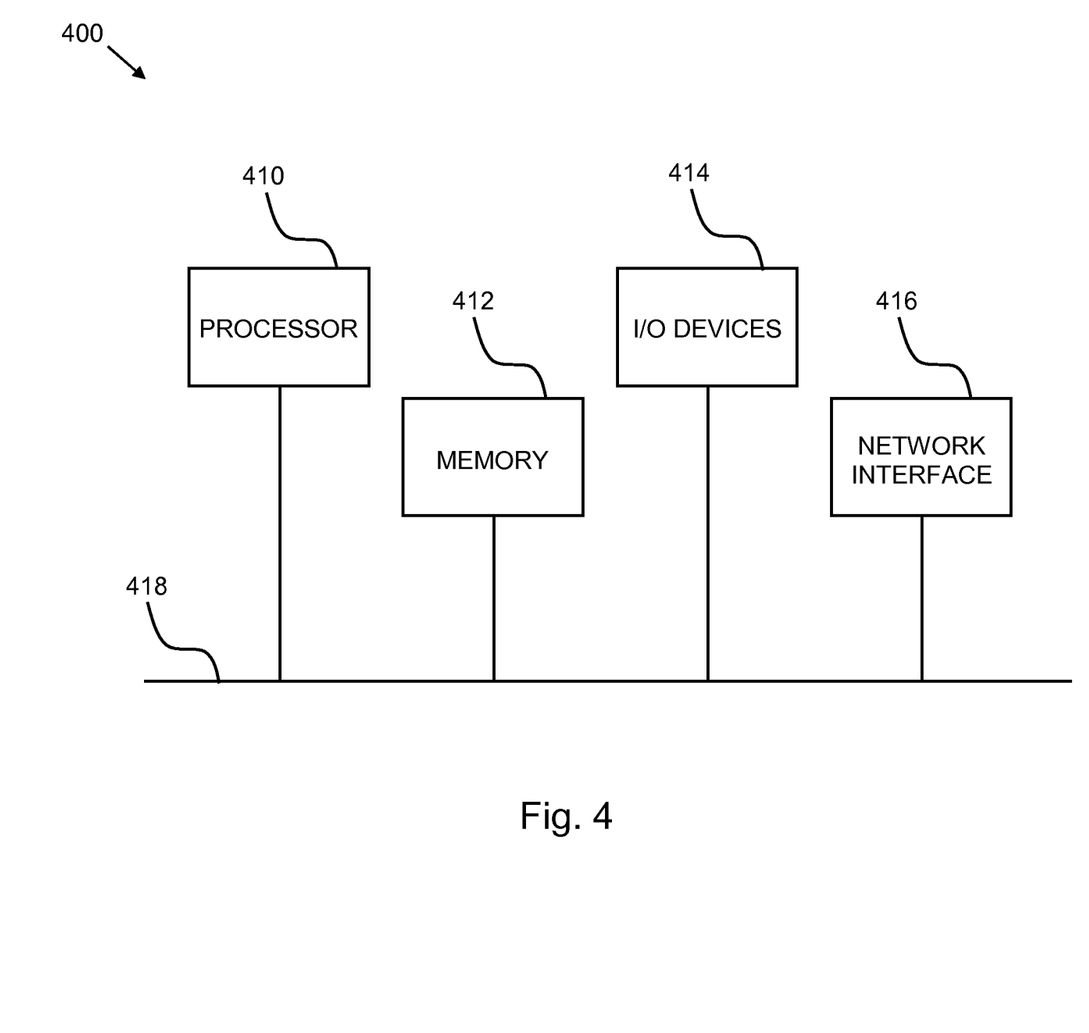
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for operating a publish-subscribe data messaging system, the method comprising:
   receiving at a first computer-hosted software application a publication topic associated with a data publication, wherein the publication topic is expressed as a hierarchy of topic levels;
   selecting a formatting rule associated with a wildcard subscription that is represented in a collection of subscriptions of a second computer-hosted software application,
      wherein the wildcard subscription is expressed as a hierarchy of topic levels, and
      wherein the formatting rule identifies at least one topic level of the wildcard subscription that is represented with a wildcard token;
   for each topic level of the wildcard subscription that the formatting rule indicates is represented with a wildcard token, and that corresponds to a topic level of the publication topic, replacing the corresponding topic level of the publication topic with the wildcard token from the corresponding topic level of the wildcard subscription, thereby creating a wildcard version of the publication topic;
   determining if a match exists in the collection of subscriptions for the wildcard version of the publication topic; and
   if the match exists, forwarding the data publication from the first computer-hosted software application to the second computer-hosted software application via a data communications medium.

2. The method according to claim 1 wherein the determining is performed wherein the collection of subscriptions is represented in an approximate membership set or filter.

3. The method according to claim 2 wherein the determining is performed wherein the collection of subscriptions is represented in a Bloom filter.

4. The method according to claim 1 wherein the replacing further comprises:
    truncating the publication topic beyond a topic level of the publication topic that corresponds to the lowest topic level of the wildcard subscription that is represented with a wildcard token; and
    representing the truncated publication topic in the wildcard version of the publication topic.

5. The method according to claim 1 and further comprising sending, in association with the data publication, either of the formatting rule and an identifier identifying the formatting rule to the second computer-hosted software application.

6. The method according to claim 1 wherein the receiving comprises receiving wherein the computer-hosted software applications are brokers in a publish-subscribe data messaging system.

7. The method of claim 1 wherein the receiving, selecting, replacing, determining, and forwarding are implemented in any of
    a) computer hardware, and
    b) computer software embodied in a non-transitory, computer-readable medium.

8. A publish-subscribe data messaging system comprising:
    a topic formatter configured to
        receive at a first computer-hosted software application a publication topic associated with a data publication, wherein the publication topic is expressed as a hierarchy of topic levels,
        select a formatting rule associated with a wildcard subscription that is represented in a collection of subscriptions of a second computer-hosted software application,
            wherein the wildcard subscription is expressed as a hierarchy of topic levels, and
            wherein the formatting rule identifies at least one topic level of the wildcard subscription that is represented with a wildcard token, and
        for each topic level of the wildcard subscription that the formatting rule indicates is represented with a wildcard token, and that corresponds to a topic level of the publication topic, replace the corresponding topic level of the publication topic with the wildcard token from the corresponding topic level of the wildcard subscription, thereby creating a wildcard version of the publication topic; and
    a topic matcher configured to determine if a match exists in the collection of subscriptions for the wildcard version of the publication topic, and
    a publication forwarder configured to forward the data publication from the first computer-hosted software application to the second computer-hosted software application via a data communications medium if the match exists.

9. The system according to claim 1 wherein the collection of subscriptions is represented in an approximate membership set or filter.

10. The system according to claim 9 wherein the collection of subscriptions is represented in a Bloom filter.

11. The system according to claim 1 wherein the topic formatter is configured to
    truncate the publication topic beyond a topic level of the publication topic that corresponds to the lowest topic level of the wildcard subscription that is represented with a wildcard token, and
    represent the truncated publication topic in the wildcard version of the publication topic.

12. The system according to claim 9 wherein the publication forwarder is configured to send, in association with the data publication, either of the formatting rule and an identifier identifying the formatting rule to the second computer-hosted software application.

13. The system according to claim 9 wherein the computer-hosted software applications are brokers in a publish-subscribe data messaging system.

14. The system of claim 8 wherein the topic formatter, topic matcher, and publication forwarder are implemented in any of
    a) computer hardware, and
    b) computer software embodied in a non-transitory, computer-readable medium.

15. A computer program product for operating a publish-subscribe data messaging system, the computer program product comprising:
    a non-transitory, computer-readable storage medium; and
    computer-readable program code embodied in the storage medium, wherein the computer-readable program code is configured to
        receive at a first computer-hosted software application a publication topic associated with a data publication, wherein the publication topic is expressed as a hierarchy of topic levels,
        select a formatting rule associated with a wildcard subscription that is represented in a collection of subscriptions of a second computer-hosted software application,
            wherein the wildcard subscription is expressed as a hierarchy of topic levels, and
            wherein the formatting rule identifies at least one topic level of the wildcard subscription that is represented with a wildcard token,
        for each topic level of the wildcard subscription that the formatting rule indicates is represented with a wildcard token, and that corresponds to a topic level of the publication topic, replace the corresponding topic level of the publication topic with the wildcard token from the corresponding topic level of the wildcard subscription, thereby creating a wildcard version of the publication topic,
        determine if a match exists in the collection of subscriptions for the wildcard version of the publication topic, and
        if the match exists, forward the data publication from the first computer-hosted software application to the second computer-hosted software application via a data communications medium.

16. The computer program product according to claim 15 wherein the collection of subscriptions is represented in an approximate membership set or filter.

17. The computer program product according to claim 16 wherein the collection of subscriptions is represented in a Bloom filter.

18. The computer program product according to claim 15 wherein the computer-readable program code is configured to truncate the publication topic beyond a topic level of the publication topic that corresponds to the lowest topic level of the wildcard subscription that is represented with a wildcard token, and represent the truncated publication topic in the wildcard version of the publication topic.

19. The computer program product according to claim 15 wherein the computer-readable program code is configured to send, in association with the data publication, either of the formatting rule and an identifier identifying the formatting rule to the second computer-hosted software application.

20. The computer program product according to claim 15 wherein the computer-hosted software applications are brokers in a publish-subscribe data messaging system.

* * * * *